March 9, 1965     T. E. KIRK ETAL     3,173,077
SEMICONDUCTOR VOLTAGE REGULATOR
Filed Aug. 6, 1962
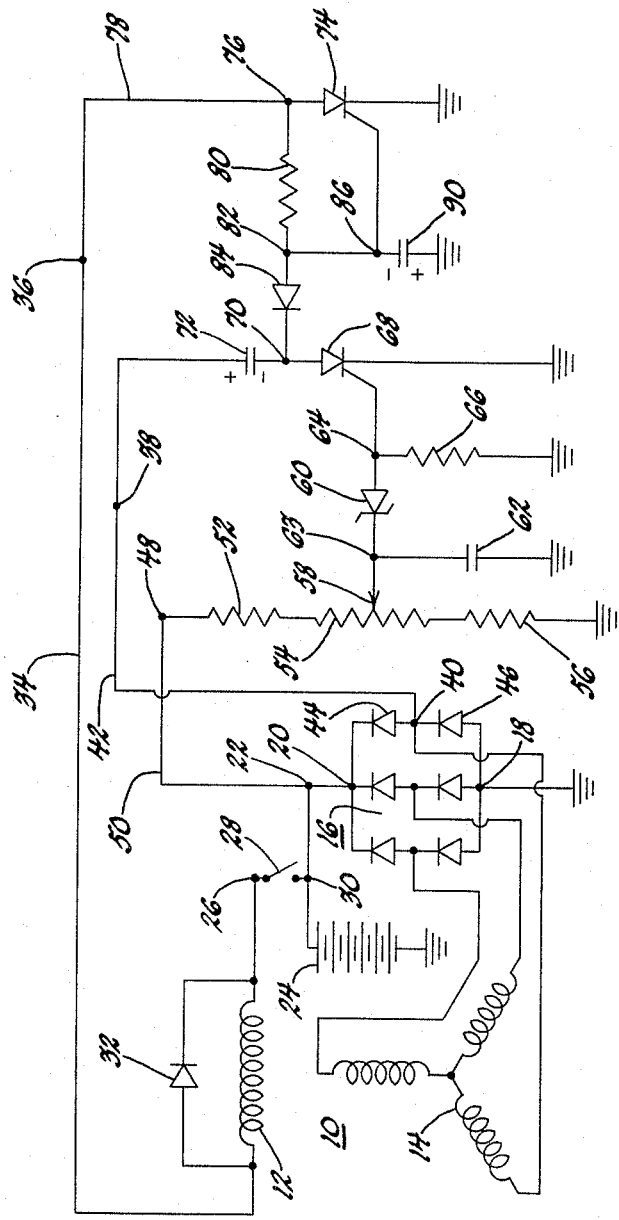
INVENTORS
Thomas E. Kirk
Gerald O. Huntzinger
BY
C. R. Meland
THEIR ATTORNEY 3,173,077
SEMICONDUCTOR VOLTAGE REGULATOR
Thomas E. Kirk and Gerald O. Huntzinger, Anderson, Ind., assignors to General Motors Corporation, Detroit, Mich., a corporation of Delaware
Filed Aug. 6, 1962, Ser. No. 215,187
11 Claims. (Cl. 322—73)

This invention relates to voltage regulators of the semiconductor type and more particularly to voltage regulators for controlling the field current of a generator.

For several years, it has been common practice to use voltage regulators of the vibrating contact type in motor vehicle electrical systems. The most widely used type of regulator has been the three unit type of regulator which included a cut out relay, a current regulating relay and a voltage regulating relay. More recently, the D.C. generator in motor vehicle electrical systems has in certain instances been replaced by an A.C. generator having its output rectified by semiconductor rectifiers. In this type of system, the current regulating relay has been eliminated and the semiconductor diodes have been effective to prevent the battery from discharging through the generator. The voltage regulating relay has been maintained and where it is of the vibrating contact type, the contacts are subject to deterioration by constant opening and closing and by burning of the contact points. In some systems such as that shown in the Short patent, Re. 24,715, the voltage regulation has been accomplished through transistors instead of vibrating contacts and a static system has been provided.

The voltage regulator of this invention is of the static type but instead of using transistors as the element for controlling field current it uses controlled rectifiers. The controlled rectifier is turned "on" and "off" at a rapid rate and this turning "on" and "off" is controlled by a voltage sensitive circuit that senses the output voltage of a direct current power source such as a D.C. generator or an alternating current generator that has its output rectified by diodes which may be of the PN junction semiconductor type. The voltage sensitive circuit can be completely static and can include a voltage divider network and a Zener diode.

It accordingly is an object of this invention to provide a voltage regulator for controlling the field current of a generator which includes a controlled rectifier.

Another object of this invention is to provide a voltage regulating circuit for a generator that includes a plurality of controlled rectifiers at least one of which can be turned on and off by varying a voltage applied to the gate electrode of the controlled rectifier.

A further object of this invention is to provide a voltage regulating circuit for a system that includes an alternating current generator and a three phase full wave bridge rectifier circuit connected therewith, the regulator circuit including a plurality of controlled rectifiers and wherein the conduction of one of these controlled rectifiers is controlled by a circuit that includes a capacitor, one side of which is connected between two diodes of the bridge rectifier network.

A further object of this invention is to provide a voltage regulating circuit that includes at least two controlled rectifiers and a capacitor which discharges through one of the controlled rectifiers to apply a voltage across the gate and cathode electrodes of the other controlled rectifier to turn it off.

Further objects and advantages of the present invention will be apparent from the following description, reference being had to the accompanying drawing wherein a preferred embodiment of the present invention is clearly shown.

In the drawing:

The single figure drawing is a schematic circuit diagram of a voltage regulating system made in accordance with this invention.

Referring now to the drawing, the reference number 10 generally designates an alternating current generator which has a field winding 12 and a three phase Y-connected output or stator winding 14. The phase windings of the output winding 14 are connected with a three phase, full wave bridge rectifier network which is made up of six diodes of the PN junction semiconductor type which may be, for example, silicon diodes. It is seen that one of the D.C. output terminals 18 of the bridge rectifier is grounded whereas the other D.C. output terminal 20 is connected with a junction 22. The junction 22 is connected to one side of a battery 24, the opposite side of the battery being grounded. It can be seen that the bridge rectifier 16 will supply charging current for the battery 24 and will also supply any other D.C. loads used on a motor vehicle. It will be appreciated that the field winding 12 is driven by the engine of the motor vehicle and that when the field winding is energized, a three phase A.C. voltage is developed in the output winding 14.

One side of the field winding 12 is connected with junctions 22 and 26. A manually operable switch 28 is connected between junctions 26 and 30 and when the switch is closed, the field winding 12 can be initially energized from the battery 24 to cause the generator 10 to build up. A transient voltage suppressing diode 32 is connected across the field winding 12. One side of the field winding 12 is connected with lead wire 34 which in turn is connected to one input field terminal 36 of the semiconductor voltage regulator of this invention.

The voltage regulator in addition to the field terminal 36 has a terminal 38 which is connected with junction 40 via the lead wire 42. It is noted that the junction 40 is between diodes 44 and 46 which form a part of the bridge rectifier 16. The voltage regulator has another terminal 48 which is connected with junction 22 via the lead wire 50.

The input terminal 48 is connected to one side of a voltage dividing network which is comprised of resistors 52, 54 and 56. The resistor 54 is a variable resistor having a shiftable part 58. It is seen that one side of the resistor 56 is grounded so that the output voltage of the bridge rectifier 16 appears between junction 48 and ground and thus appears across the voltage dividing network.

The shiftable part 58 of variable resistor 54 is connected to one side of a Zener diode 60. A capacitor 62 is connected between junction 63 and ground. This capacitor may have a capacity by way of example of .25 mfd. The opposite side of the Zener diode 60 is connected with a junction 64 and a resistor 66 is connected between this junction and ground.

The junction 64 is connected with the gate electrode of a silicon controlled rectifier 68. The controlled rectifier 68 is of a type which cannot be controlled by varying the voltage of the gate electrode with respect to the cathode. In other words, the silicon controlled rectifier 68 is of a type wherein the voltage of the cathode must be made higher or substantially equal to the voltage of the anode in order to turn it off once it has been previously biased to its conductive state between its anode and cathode. Putting it another way, the gate electrode of controlled rectifier 68 loses control once it is switched to its conductive state and some means other than varying its gate voltage must be provided to turn it off. It will be appreciated, however, that this controlled rectifier 68 could be of a type that can be controlled by varying the voltage of its gate electrode, all of which is to be more fully described hereinafter.

The anode of the controlled rectifier 68 is connected with junction 70 and it is seen that a capacitor 72 is connected between junction 38 and junction 70. The cathode of the controlled rectifier 68 is connected directly to ground as is clearly apparent from the drawing. The capacity of the capacitor 72 may be, for example, 22 mfd.

The voltage regulator has another controlled rectifier 74 which differs from the controlled rectifier 68 in that the anode to cathode current can be turned on and off by varying the voltage of the gate electrode. This type of controlled rectifier has been recently developed and may also be termed a PNPN silicon gate controlled switch. The controlled rectifier 74 thus is of a type which is capable of being turned off when the cathode has a higher potential than the gate electrode and even though the anode is at this time at a higher potential than the cathode. As was noted above, the controlled rectifier 68 is a standard type but it could be of the same type as controlled rectifier 74.

The cathode of controlled rectifier 74 is grounded. The anode of controlled rectifier 74 is connected with a junction 76. The junction 76 is connected with terminal 36 of the regulator via a lead wire 78. A resistor 80 connects junctions 76 and 82 and a diode 84 connects the junctions 70 and 82. The junction 82 is connected with junction 86 which in turn is connected with the gate electrode of controlled rectifier or gate controlled switch 74. A capacitor 90 which may be, for example, 10 mfd. is connected between junction 86 and ground.

When the manually operable switch 28 is closed, the field winding 12 is energized to provide an initial flux for building up of the generator 10. This initial energizing circuit can be traced from junction 30, through switch 28, through field winding 12, through lead wires 34 and 78 and then through the anode to cathode circuit of controlled rectifier 74 to ground. The controlled rectifier at this time will be turned on since the junction 86 will be positive with respect to ground and the gate electrode of controlled rectifier 74 will therefore be positive with respect to its cathode. The conducting characteristic of the controlled rectifier or gate controlled switch 74 is satisfied and field current will therefore flow through the field winding 12.

As the generator builds up, the controlled rectifier 74 is maintained in a turned on condition since the voltage appearing at junction 22 will be increasing to some desired value greater than battery voltage. The time will come when the voltage which appears between tap 58 and ground is of such a value as to break down the Zener diode 60 in a reverse direction. The voltage at which the Zener diode breaks down is the desired output voltage of the bridge rectifier 16 and this voltage can be set by adjusting the adjustable tap 58. When the reference voltage of the Zener diode 60 is exceeded, a small change in voltage applied will cause a large change in Zener current. This current flows through resistor 66 and the gate-cathode junction of controlled rectifier 68 and provides turn-on voltage and current for controlled rectifier 68 to turn it on.

It is pointed out that the voltage being applied to terminal 38 of the voltage regulator is the same voltage that appears at junction 40 between diodes 44 and 46. This voltage varies between positive and negative values and provides a pulsating direct current. On the negative swing of this voltage, the voltage may actually go to some small value below ground potential of the bridge rectifier 16 and then swings to a predetermined positive potential with respect to ground.

When the Zener diode 60 is conducting to turn on controlled rectifier 68, the capacitor 72 will be charged through controlled rectifier 68 with the polarity shown on the drawing when the voltage at junction 40 goes positive. When the voltage at junction 40 now goes negative, the voltage of the anode of controlled rectifier 68 will go to a potential that is 12 volts less than ground potential in a 12 volt system due to the charged condition of capacitor 72. When this occurs, it can be seen that the cathode of controlled rectifier 68 is now at a higher potential than its anode and the controlled rectifier 68 will therefore be turned off.

When the junction 70 is driven below ground potential, the capacitor 72 will discharge to turn off the controlled rectifier 74. This discharge path is from the top side of capacitor 72, through lead wire 42, through diode 44, through battery 24 to ground, through the cathode of controlled rectifier 74, through the gate electrode of controlled rectifier 74 to the junction 86, and then through junction 82 and diode 84 to the opposite side of the capacitor. It can be seen that this potential which was accumulated by the capacitor 72 is of such a value as to instantaneously drive the cathode of controlled rectifier 74 to a potential which is positive with respect to the gate electrode. This causes the controlled rectifiers 74 to turn off in its anode-cathode circuit which turns off the field current for field winding 12 with a consequent reduction in the output voltage of the alternator 10. When the output voltage reduces, the voltage appearing across the voltage divider network from junction 48 to ground reduces so that this voltage is lowered to the point where Zener diode 60 no longer conducts enough to provide a bias to maintain controlled rectifier 68 turned on. The controlled rectifier 68 will therefore be turned off.

When capacitor 72 discharges, the capacitor 90 is charged from capacitor 72 through a circuit that includes diode 84 to the polarity shown to maintain the controlled rectifier 74 turned off until the output voltage of the generator-rectifier combination has dropped to a point to maintain the controlled rectifier turned off.

The foregoing is only a description of one short cycle of operation of the voltage regulator of this invention. The voltage regulator will repeat this one cycle constantly during operation of the electrical system. In other words, the controlled rectifiers 68 and 74 are constantly switched on and off so that an average D.C. current flows through the field winding 12 to maintain the output voltage of the generator-bridge rectifier combination substantially constant.

While the embodiment of the present invention as herein disclosed constitutes a preferred form, it is to be understood that other forms might be adopted.

What is claimed is as follows:

1. In combination, an alternating current generator having a three phase output winding and a field winding, a three phase full wave bridge rectifier network connected having input terminals connected with the phase windings of said three phase output winding and having a pair of D.C. output terminals, a gate controlled switch having anode, cathode and gate electrodes, said gate controlled switch being capable of being turned on and off in its cathode-anode circuit by varying the voltage of its gate electrode, a circuit for energizing the field winding of said generator from said bridge rectifier network including the anode-cathode circuit of said gate controlled switch, a controlled rectifier, a capacitor, a charging circuit for said capacitor connected between the junction point of two diodes of said bridge rectifier network and a D.C. output terminal of said bridge rectifier network and including the anode-cathode circuit of said controlled rectifier, and a discharging circuit for said capacitor including the gate and cathode electrodes of said gate controlled switch.

2. In combination, an alternating current generator having a field winding and a three phase output winding, a three phase full wave bridge rectifier network connected with said output winding, a gate controlled switch having anode, cathode and gate electrodes, said gate controlled switch being capable of being turned on and off by the application of a varying voltage to the gate electrode thereof, a circuit for energizing said field winding from said three phase output winding including the anode and cathode electrodes of said gate controlled switch, a capacitor, a circuit connecting said capacitor with the gate and cathode electrodes of said gate controlled switch whereby said gate controlled switch is turned off when said capacitor discharges, and a voltage responsive charging circuit for said capacitor having input terminals connected across one of the diodes of said three phase full wave bridge rectifier network.

3. In combination, a generator having an output winding and a field winding, a gate controlled switch having anode, cathode and gate electrodes, said gate controlled switch being capable of being turned on and off by applying a variable voltage to the gate electrode thereof, a circuit for energizing said field winding from said output winding including the anode-cathode circuit of said gate controlled switch, a capacitor, means interconnecting said capacitor with the gate and cathode electrodes of said gate controlled switch whereby said capacitor discharges through the cathode-gate circuit of said gate controlled switch at predetermined intervals, and a voltage responsive charging circuit for said capacitor connected with the output winding of the generator.

4. In combination, a voltage source, a circuit element, a first controlled rectifier including anode, cathode and gate electrodes, said first controlled rectifier being capable of being turned on and off by varying the voltage of its gate electrode, a second controlled rectifier having anode, cathode and gate electrodes, a capacitor, a charging circuit for said capacitor connected with said voltage source including the anode-cathode circuit of said second controlled rectifier, a voltage responsive circuit including a Zener diode connected with said voltage source and the gate and cathode electrodes of said second controlled rectifier for controlling the charging of said capacitor through said charging circuit, and a discharging circuit for said capacitor for turning off said first controlled rectifier including the cathode-gate circuit of said first controlled rectifier, said discharging circuit connecting said capacitor in series with the gate and cathode electrodes of said first controlled rectifier.

5. In combination, a generator having an output winding and a field winding, first and second controlled rectifiers each having anode, cathode and gate electrodes, at least one of said controlled rectifiers being capable of being turned on and off by varying a voltage applied between its gate and cathode electrodes, an energizing circuit for said field winding connected with said output winding and including the anode-cathode circuit of said first controlled rectifier, a first capacitor, a charging circuit for said first capacitor including the anode-cathode circuit of said second controlled rectifier, a second capacitor connected across the gate and cathode electrodes of said first controlled rectifier, and a discharging circuit for said first capacitor including the cathode-gate circuit of said first controlled rectifier and said second capacitor, said second capacitor being operative to maintain said first controlled rectifier in a turned off condition for an interval of time following the discharging of said first capacitor.

6. In combination, an alternating current generator having an output winding and a field winding, a bridge rectifier network connected with said output winding, a gate controlled switch having anode, cathode and gate electrodes, said gate controlled switch being capable of being turned on and off by varying the potential difference between its gate and cathode electrodes, a capacitor, a voltage responsive charging circuit for said capacitor responsive to the output voltage of said output winding and connected across one of the diodes of said bridge rectifier network, and a discharge circuit for said capacitor for turning off said gate controlled switch including one of the diodes of said bridge rectifier network and the cathode-gate circuit of said gate controlled switch.

7. A voltage regulating circuit for controlling the energization of a field winding of a generator comprising first, second and third input terminals, said first input terminal being adapted to be connected with the field winding of said generator and said second and third terminals being adapted to be connected across one diode of a bridge rectifier network, a gate controlled switch having anode, cathode and gate electrodes, said gate controlled switch being of a type that can be turned on and off by varying the potential difference of its gate and cathode electrodes, means connecting the anode-cathode circuit of said gate controlled switch between said first and third terminals, a capacitor, a voltage responsive charging circuit for said capacitor connecting said capacitor across said second and third terminals, and a circuit connecting the gate electrode of said gate controlled switch with one side of said capacitor.

8. In combination, a generator having an output winding and a field winding, a gate controlled switch having anode, cathode and gate electrodes, said gate controlled switch being of a type which can be turned on and off by varying the potential appearing between its gate and cathode electrodes, an energizing circuit for said field winding connected with said output winding and including the anode-cathode circuit of said gate controlled switch, a controlled rectifier having anode, cathode and gate electrodes, a capacitor, a charging circuit for said capacitor connected with said output winding and including the anode-cathode circuit of said controlled rectifier, means connected with said output winding for developing a control voltage which is proportional to the output voltage of said output winding, a Zener diode connected with said gate electrode of said controlled rectifier and with said means for developing said control voltage, and means connecting said capacitor with the gate and cathode electrodes of said gate controlled switch whereby said gate controlled switch can be turned off by a discharging of said capacitor.

9. In combination, an alternating current generator having a three phase output winding and a field winding, a three phase full wave bridge rectifier network connected with said output winding having D.C. output terminals, a gate controlled switch having anode, cathode and gate electrodes, said gate controlled switch being of a type which can be turned on and off by varying the potential appearing between its gate and cathode electrodes, an energizing circuit for said field winding connected across said D.C. output terminals of said bridge rectifier network and including the anode-cathode circuit of said gate controlled switch, a controlled rectifier having anode, cathode and gate electrodes, a capacitor, a charging circuit for said capacitor connected between one D.C. output terminal of said bridge rectifier network and a junction of two diodes of said bridge rectifier network, said charging circuit including said capacitor and anode-cathode circuit of said controlled rectifier, a voltage divider connected across the D.C. output terminals of said bridge rectifier, a Zener diode connected between the gate electrode of said controlled rectifier and said voltage divider, and a circuit for discharging said capacitor through the cathode-gate circuit of said gate controlled switch to turn off said gate controlled switch.

10. A voltage regulating circuit for controlling current flow through a circuit element in accordance with the output voltage of a variable direct current source comprising a gate controlled switch having anode, cathode and gate electrodes, a source of direct current, a circuit connected across said source of direct current including in a series connection said circuit element and the anode-cathode circuit of said gate controlled switch, a capacitor, a discharging circuit for said capacitor operable to turn off said gate controlled switch and including the gate-cathode circuit of said gate controlled switch, and a charging circuit for said capacitor connected with said voltage source and including means responsive to the magnitude of voltage of said voltage source, said charging circuit preventing charging of said capacitor until the voltage of said source rises above a predetermined value as determined by said means responsive to the magnitude of voltage of said voltage source.

11. A voltage regulating circuit comprising power input conductors adapted to be connected with a source of variable direct current, first and second controlled rectifiers, at least one of said controlled rectifiers being of a type that can be turned on and off in its anode-cathode circuit by varying the potential of its gate electrode, a capacitor, a charging circuit for said capacitor connected with said power input conductors and including the anode-cathode circuit of said first controlled rectifier, a voltage responsive circuit having an input connected with said input supply conductors and having an output connected with the gate and the cathode electrode of said first controlled rectifier, said voltage responsive circuit controlling the charging of said capacitor through the anode-cathode circuit of said first controlled rectifier, a discharging circuit for said capacitor for switching off said second controlled rectifier including the gate-cathode circuit of said second controlled rectifier, and a diode, said diode connecting the anode of said first controlled rectifier and the anode of said second controlled rectifier, said discharging circuit connecting said capacitor in series with the gate and cathode electrodes of said second controlled rectifier and including said diode.

References Cited by the Examiner
UNITED STATES PATENTS

| | | | |
|---|---|---|---|
| 3,040,270 | 6/62 | Gutzwiller | 323—22 |
| 3,085,165 | 4/63 | Schaffert | 323—22 |
| 3,097,335 | 7/63 | Schmidt | 321—45 |

LLOYD McCOLLUM, *Primary Examiner.*